Aug. 27, 1929.  S. A. DALAGER  1,726,386
POWER TAKE-OFF
Filed Nov. 11, 1927  2 Sheets-Sheet 1
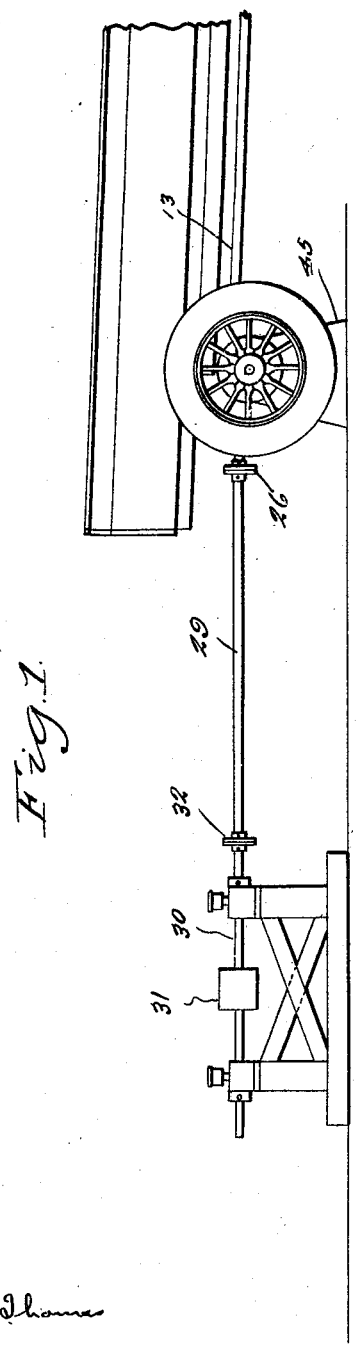
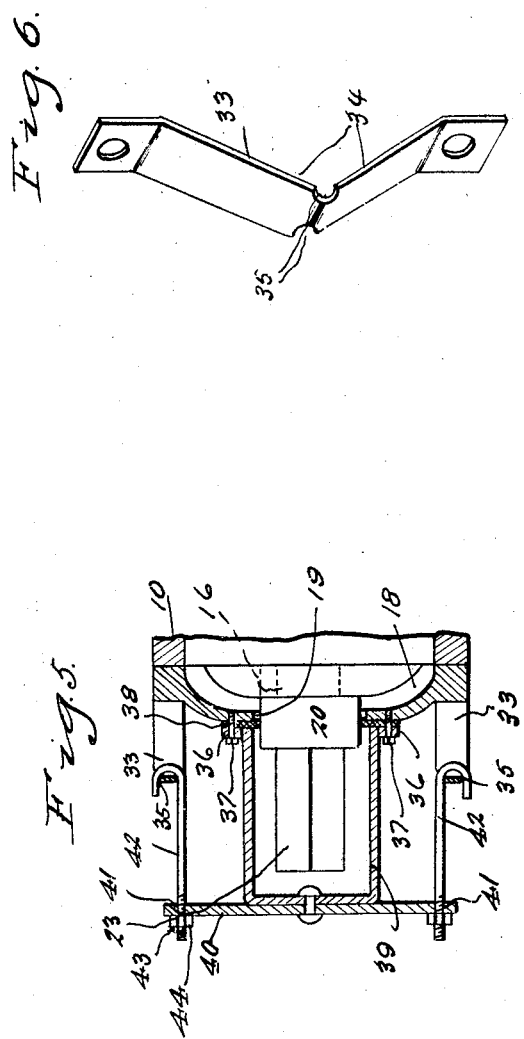
S. A. Dalager
INVENTOR
BY Victor J. Evans
ATTORNEY Aug. 27, 1929.   S. A. DALAGER   1,726,386
POWER TAKE-OFF
Filed Nov. 11, 1927   2 Sheets-Sheet 2
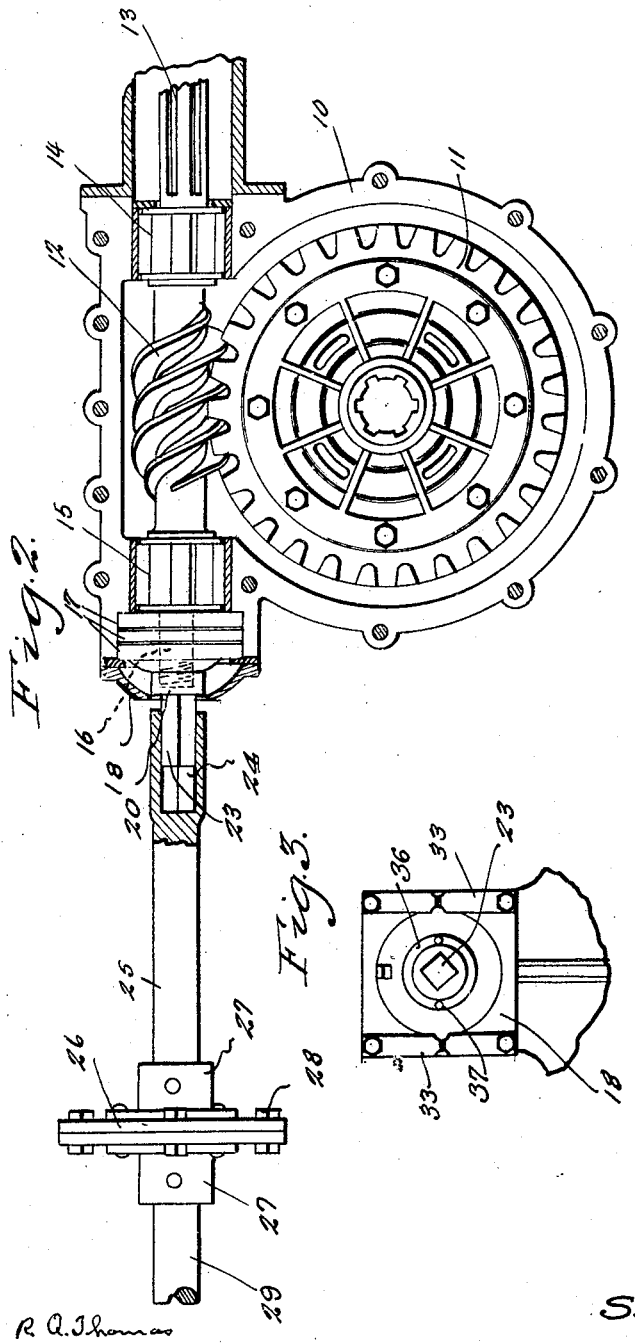
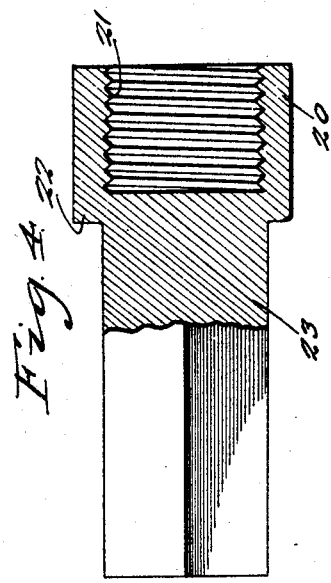
S. A. Dalager
INVENTOR
BY Victor J. Evans
ATTORNEY
WITNESS:

Patented Aug. 27, 1929.

1,726,386

UNITED STATES PATENT OFFICE.

SOPHUS A. DALAGER, OF GLENWOOD, MINNESOTA.

POWER TAKE-OFF.

Application filed November 11, 1927. Serial No. 232,644.

The present invention relates to power takeoffs and is especially adapted to be used in connection with Ford trucks.

An object of the invention is to provide a takeoff which may be connected directly with the drive shaft of a Ford truck or to the drive shaft of any truck having a worm transmission.

Other objects are simplicity of construction and facility of operation.

A further object is to so modify the power transmission differentials of the truck that the power takeoff may be readily placed thereon or dismounted without material modification thereof.

Another object is to provide a cover for an aperture formed in the differential casing for the above named apparatus which may be quickly and easily placed thereupon and which will remain in place without danger of dislodgement.

Other objects and advantages will appear from the following specification and will be set forth in the appended claims, and I do not wish to be limited in the scope of my invention except as I shall be limited by said claims.

In the drawings:

Figure 1 is an elevation of the connection of a takeoff in accordance with my invention connected with the transmission differential and with a pulley connection.

Figure 2 is a detail showing the connection with the drive shaft.

Figure 3 is a detail view, looking toward the differential casing.

Figure 4 is an enlarged detail, showing a nut for forming a connection between the drive shaft of the truck and the transmission shaft of my invention.

Figure 5 is a detail view of a cap formed in accordance with my invention and adapted to cover the aperture made in the differential casing for applying my invention to the drive shaft.

Figure 6 is a detail view of one of the spring brackets forming a part of the connection for holding the supplemental cap in place over said aperture.

Referring to the drawings in detail, 10 designates a differential casing having a worm wheel 11 therein, 12 is a worm formed on the drive shaft 13 of the truck, and 14 and 15 are bearings supporting the portion of the shaft 13 on which the worm 12 is formed.

Extending rearwardly from the bearing 15 is a threaded shank 16 on the end of the shaft 13 about which but not covering said threads are located thrust disks 17. Placed over the end of the differential casing is a cap 18 normally closed, but formed with an opening 19 through which may project an end of the nut 20 by which I make the connection with the drive shaft. The nut 20 I prefer to call "the long nut" and said nut is provided with a bore 21 formed at one end and extending a distance therethrough sufficient to receive the threaded end of the shank 16. The portion of the nut having the internal thread is somewhat enlarged compared with the rest of the nut, forming a shoulder 22 and a shank 23, the latter being squared as shown in Figure 3, or, as will be obvious to those skilled in the art, may be of any other polygonal cross section. The squared shank 23 is adapted to fit in a similarly shaped socket 24 which I provide in a shaft 25, to one end of which is secured a universal joint 26 comprising collars 27 and vibroid disks 28 secured together, one of the collars 27 being secured to the shaft 25 and the other to a transmission shaft 29, to which the driven mechanism, as the pulley shaft 30 having a pulley 31 thereon, may be attached, preferably by a second universal joint 32 of a construction similar to that at 26. It is my purpose to leave the long nut 20 in place on the end of the transmission shaft, in which case it is obvious that it will project through the aperture 19, and in order to provide a closure for said aperture which may be quickly and readily adjusted in place to cover the opening and prevent dirt and other foreign matter from getting into the differential casing, I provide at the sides of the cap 18 spring members 33 having converging portions 34, at the apex of which are formed oppositely disposed notches 35. Secured about the aperture 19 through the instrumentality of screw bolts 37 is a ring 36. Between said ring and the cap is a gasket 38 formed from rubber or other suitable yieldable material such as leather or the like, and for housing the projecting end 23 of the long nut I provide a casing 39 adapted to have its open end engaging the inner side of the ring and the outer surface of the gasket 38 as clearly shown in Figure 5 of the drawings. A cross member 40 is secured to the rear end of the casing 39 having its ends projecting beyond the side walls of said casing and having apertures 41 formed therein, in which apertures there are slidably mounted hooks 42, the outer ends of which are threaded as at 43 to receive the nuts 44 for purposes of adjustment.

In adapting a truck for power purposes, as indicated above, the same will be jacked up at its rear end on suitable supports 45 placed under the rear axle, whereupon the casing 39 is removed by loosening the nuts 44 and the shaft 25 is connected with the shank 23 of the long nut 20. The engine may then be started and the shafts 25 and 29 with the attached mechanism will be caused to rotate. When it is desired, however, to discontinue this operation and to use the truck for its usual purposes of locomotion, the shaft 25 may be disconnected from the shank 23 and the casing 39 placed over the aperture 19 with its edges resting on the gasket 38. The hooks 43 are then brought under the members 33 and connected in the notches 35, whereupon the nuts 44 are screwed onto the ends of the shanks 42, tightening the hooks and binding the casing 39 against the gasket.

Having described my invention, what I claim is:

1. In combination with the transmission shaft of a truck having a threaded rearwardly projecting end, a differential housing surrounding a portion of said shaft and having a cap closing an opening therein, said cap being apertured, a nut secured to the threaded end of said shaft and having a squared shank projecting through said aperture and adapted to receive means to be driven thereby, a closure for said aperture comprising a casing adapted to receive the shank of said nut and to have its open end rest against said cap, and means including spring members having converging portions notched at their junctures, hooked members having their hooks arranged in the notches and means secured to said casing and receiving said hooked members to adjustably secure said casing in position.

2. In combination with the transmission shaft of a motor vehicle, and an apertured casing surrounding the rear end thereof, a cap for closing said apertured casing and being formed with an opening, a nut threadedly connected to the rear end of said shaft, a polygonal shank formed with said nut and projecting through said opening for slidably receiving a socketed driven member including a universal joint, a casing for housing said projecting shank, spring members secured on said cap, a cross member secured to said latter casing, shanks adjustably carried by said cross member and having hooks at one end adapted to hook under said spring members.

In testimony whereof I affix my signature.

SOPHUS A. DALAGER.